United States Patent [19]

Nelson et al.

[11] 3,995,698
[45] Dec. 7, 1976

[54] PLOW MOLDBOARD GUARD

[76] Inventors: Tom Holland Nelson, R.F.D. No. 4, Box 398; Bruce Cooper Nelson, R.F.D. No. 4, Box 397, both of Berlin, Md. 21811

[22] Filed: July 11, 1975

[21] Appl. No.: 594,963

[52] U.S. Cl. .............................. 172/719; 172/759
[51] Int. Cl.² ................. A01B 17/00; A01B 15/10
[58] Field of Search ........... 172/719, 752, 754, 759

[56] References Cited
UNITED STATES PATENTS

| | | | |
|---|---|---|---|
| 114,237 | 4/1871 | Weaber | 172/752 |
| 3,063,505 | 11/1962 | Nelson | 172/754 X |

*Primary Examiner*—Paul E. Shapiro
*Attorney, Agent, or Firm*—Burton, Parker & Schramm

[57] ABSTRACT

Relates to a protective guard or shield for covering the wear area of the moldboard of a plow. The shin member of the plow assembly is provided with an integrally connected rearward extension which overlies the most serious wear area of the moldboard. The shin extension is not bolted or otherwise fastened to the moldboard but relies on a shoulder formed on the back side of the shin for engagement with the leading edge of the moldboard and the provision of a plurality of spaced apart projections on the face of the extension confronting the moldboard for bearing support thereon. The shin and its extension may be used to cover the worn area of a used moldboard or to protect such area of a new moldboard. In the latter case the projections may be ground down to provide surface contact between the shin extension and the moldboard. The shin and its extension are preferably formed of a stainless steel alloy and cast in one piece.

17 Claims, 7 Drawing Figures

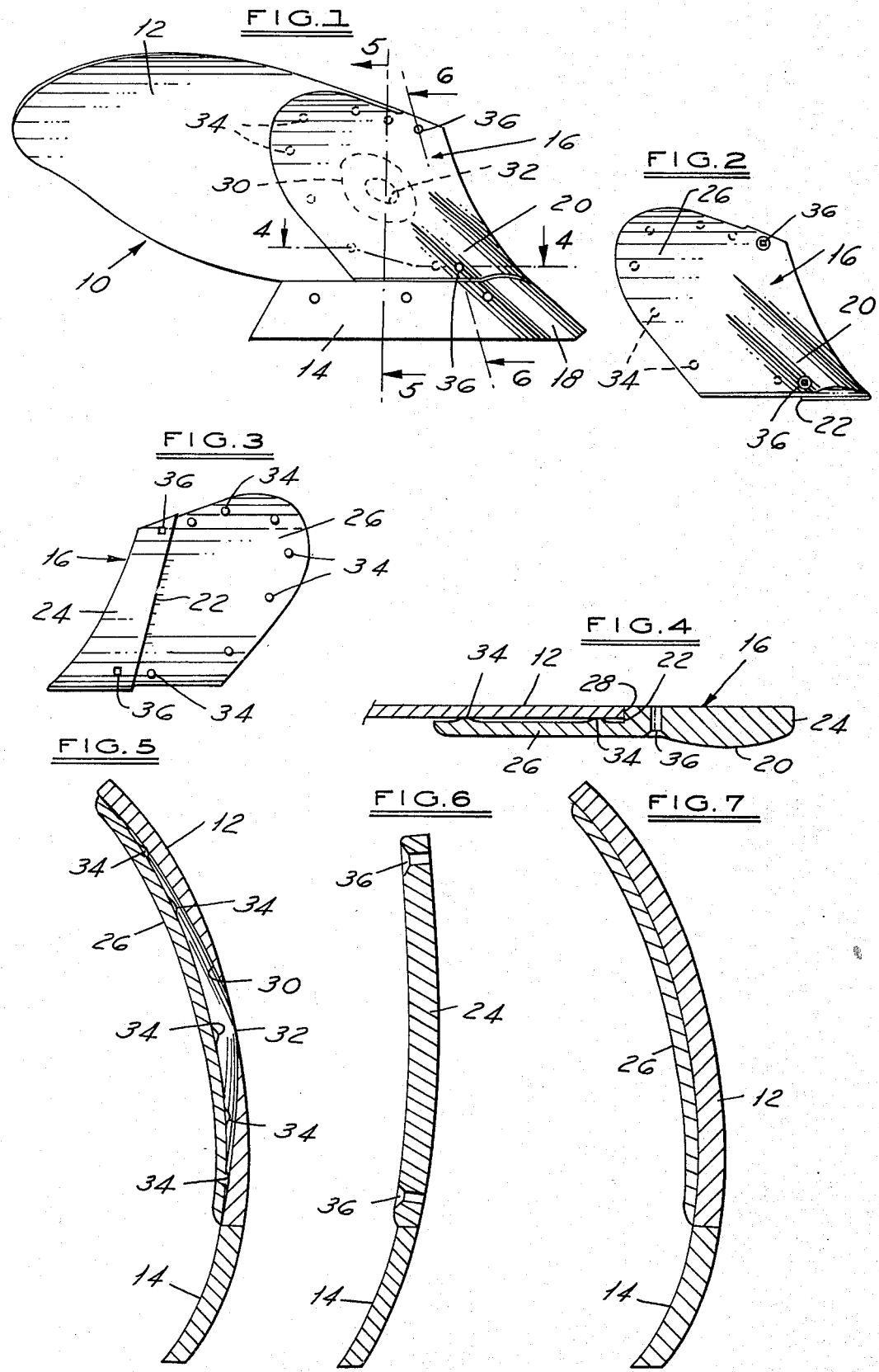

PLOW MOLDBOARD GUARD

BACKGROUND OF THE INVENTION

This invention relates to improvements in plows and more particularly to a guard plate or shield for protectingly covering the greatest wearing area of a plow moldboard.

Workers in this art have suggested protective devices of one form or another for reducing the effects of wear on plow moldboards and especially so since the advent of tractor plowing has increased the pressures encountered by the plow parts. In one instance it was suggested that for plows used in heavy clay soils the plow moldboard be covered with a stainless steel sheet. Some of the various suggestions were partially successful, but increased costs and other disadvantages precluded the wholly successful adoption of these innovations.

SUMMARY OF THE INVENTION

Accordingly, it is an important object of the invention to provide a plow of improved construction which considerably prolongs the life of the moldboard.

It is another important object of the invention to provide a low cost improvement for prolonging the life of plow moldboards which does not require attachment to the moldboard and which can be installed with ease.

It is a further important object of the invention to provide an improved guard or shield for plow moldboards which is formed of an alloy of steel having exceptional wear resistant qualities and which approaches the advantages derived from making the entire moldboard of such material while attaining such results with a substantial savings in the cost of the alloy and the production equipment.

A still further important object of the invention is to provide a moldboard guard or shield which is not attached to the moldboard yet is always in compression therewith when in use.

In carrying out these and other objects, the present invention contemplates a guard plate or shield for the moldboard component of a plow assembly which forms an extension of another component of the assembly. In the illustrated embodiment of the invention this is the shin member which except for the extension and possible additional thickness may be otherwise of conventional size and shape. The shin is divided into a thicker leading or forward section and a thinner trailing or rearward section. The two sections present a smooth uninterrupted working face for the entire area occupied by their respective front sides but at the juncture of the two sections on their respective back sides they form a shoulder. In assembled condition the shoulder abuts the leading edge of the moldboard with the result that the trailing section or extension of the shin overlies the greatest wearing area of the moldboard. It is apparent that the extension of the shin forms a guard plate or shield for an important area of the moldboard yet by virtue of its integral connection to the shin section there is no necessity for bolting or otherwise securing the shield to the moldboard. However, for supporting engagement with the moldboard it is highly desirable to provide a plurality of spaced apart projections on the rear or back side of the extension for bearing engagement with the moldboard. Such is performed by an arcuate row of protrusions formed integrally with the extension and projecting toward the moldboard in partially surrounding relation to the area of the moldboard where the severest wear takes place. When this improved guard plate is mounted on a plow having a worn moldboard, it is not expected that all of the projections will make bearing contact with the moldboard but enough will do to make the desired compressive engagement between the guard plate and the moldboard.

Additionally, to further increase the hardness and toughness of the improved guard plate to the abrasive action of the soil, it is preferred to form the plate and attached shin out of a specially durable type of stainless steel. A guard plate and shin combination formed of this material will wear appreciably longer than pressed steel plow parts which is the conventional way of forming the moldboard. Moreover, this preferred material is durable, hard and highly wear resistant, and in addition the material provides a mirror-like polished surface which is rustless under atmospheric conditions. For a more detailed understanding of the use of this wear resistant steel alloy, attention is directed to U.S. Pat. No. 3,063,505 granted Nov. 13, 1962 to Tom Holland Nelson.

Various other objects, advantages and meritorious features will become more fully apparent from the following specification, appended claims and accompanying drawing figures, wherein:

BRIEF DESCRIPTION OF THE DRAWING

FIG. 1 is a side elevation of a plow constructed and assembled in accordance with this invention and showing the combined shin and shield extension in overlying relation to the plow moldboard;

FIG. 2 is a detail view of the combined shin and shield extension similar to that shown in FIG. 1 but showing the same separate and apart from the other members of the plow;

FIG. 3 is a view similar to FIG. 2 but showing the reverse side of the shin and shield extension;

FIG. 4 is an enlarged sectional view taken along line 4—4 of FIG. 1 and illustrating the abutting relationship between the shoulder on the shin and the leading edge of the moldboard;

FIG. 5 is an enlarged vertical cross sectional view taken along line 5—5 of FIG. 1 and particularly showing the mounting relationship of the combined shin and shield extension on a seriously worn moldboard;

FIG. 6 is an enlarged cross sectional view taken along line 6—6 of FIG. 1 showing the abutting relationship between the shin and plowshare; and FIG. 7 is an enlarged cross sectional view similar to FIG. 5 but showing the combined shin and shield member overlying the most wearable area of a new moldboard.

DESCRIPTION OF PREFERRED EMBODIMENTS

The aforesaid U.S. Pat. No. 3,063,505 may be referenced for a showing of how a plurality of plows may be mounted on a framework and drawn behind a tractor in offset tandem relationship to one another and for indicating the flow paths of the soil as each plow advances therethrough. The present invention has to do with an area of a plow differing from that disclosed in the referenced patent but still resulting from the wearing or abrasive action of the soil on the plow parts. Most moldboards of conventional plows are formed of pressed steel, a material that wears comparatively easily. Because the moldboard is the most expensive part of the plow, it will frequently be used even after a hole has been worn through the metal. The present invention not only provides a shield over a working face of the moldboard but does so in a manner enabling the use of a more wear resistant but more expensive material yet accomplishing this end without requiring the drilling of holes in the protective shield or moldboard for fastening purposes. More specifically, the protective shield is formed of a stainless steel alloy cast in such a manner as to constitute the shin member of the plow assembly and to provide an extension thereof for overlying the greatest wearing area of the moldboard.

Referring now to FIG. 1, an assembled plow in accordance with this invention is generally indicated at 10 and comprises three major elements usually fabricated separately and assembled together, the moldboard 12, the plowshare 14 and the third member 16 which is a combined shin and shield as later described more particularly herein. These plow parts are bolted or otherwise fixed to a supporting frame in a conventional manner and since the construction of such a support forms no part of the present invention it is not illustrated herein.

As discussed in the aforesaid reference patent, the front end or nose section 18 of the plow encounters the greatest wearing action of the soil. This required frequent replacements of worn plowshares with new ones. The subject matter of the referenced patent was devoted to the build up of an elongated ridge 20 on the share to extend its life and increase its efficiency. This ridge exhibits a cylindrical surface configuration extending across the forward area of the share and parallel to the front or leading edge of the plow. The maximum height of the ridge is in spaced parallel relation to the leading edge of the plow as indicated in FIGS. 2 and 4. This bulge of metal forming the ridge continues on into the lower area of the shin section of the plow as shown at 22 and thereafter it gradually diminishes in height the further it advances into the shin section until it fades into the normal thickness of the shin. This patented feature is still used on plow parts made and sold under license from the referenced patent and special mention is made of its presence in the illustrated embodiment because the feature is helpful in spreading the wearing soil paths over a wider area of the moldboard thus lessening the wearing action of the soil on the moldboard.

Considering features of the plow assembly making up the present invention, the combined shin and shield member 16 is separately illustrated in FIGS. 2 and 3, the former being a side elevation of the front or working face of member and the latter being a back view of the same member. The front side bears the continuation 20 of the previously mentioned ridge 18 on the plowshare. The reverse or back side of the combined shin and shield 16 bears a line of demarcation 22 representing a sharp, right-angled shoulder caused by a difference in thickness of the shin section 24 and its shield extension 26. A conventionally shaped shin member of a plow would terminate at this shoulder line. However, in carrying out one of the objects of this invention the shin section 24 is approximately twice the thickness of the shield extension 26 and this difference is employed to form an abrupt shoulder for abutting engagement with the leading edge of the moldboard when the two parts are properly assembled into a plow. The enlarged cross sectional view represented by FIG. 4 shows the shoulder 22 in properly assembled condition and abutting the leading or forward edge 28 of the moldboard 12. It further shows the thinner shield extension 26 overlying a portion of the working face of the moldboard 12.

As earlier recited herein, the moldboard is subject to a scouring action as the plowed soil sweeps over its working face. The greatest wearing area on the moldboard occurs in the forward third section thereof and approximately halfway between the upper and lower edges thereof. FIGS. 1 and 5 illustrate a severe wearing condition in this area where not only is the moldboard thinned but reduced in thickness to the extent that a hole is formed which extends through the moldboard to the rear or non-working side thereof. In FIG. 1 the severely thinned area is represented by the larger dashed oval indicated at 30 and the hole by the smaller dashed oval 32. The enlarged cross sectional view of FIG. 5 is taken on a line intersecting the hole 32 worn in the moldboard and illustrates the progressively increasing thickness of the moldboard area in all directions receding away from the hole.

The shield portion 26 of the shin member 16 is arcuately bowed as shown in FIG. 5 to conform to the curvature of the moldboard 12 and to extend rearwardly of the moldboard sufficiently to cover the greatest wearing area thereof. Being an integral part of the shin member the shield 26 need not be bolted or otherwise secured to the moldboard or to the supporting frame behind the moldboard. However, because of the recessed area caused by the wear action of the soil, it is desirable to provide bearing supports between the shield or guard 26 and the working face of the moldboard. Such is illustrated by the provision of a plurality of spaced apart small bumps or protrusions 34 formed on the inner face of the shield confronting the working face of the moldboard. Moreover, it is preferred that the protrusions be arranged in an arcuate row partially surrounding the severest wear area of the moldboard represented by the dashed ovals 30 and 32 in FIG. 1. Arranged in this manner, it is apparent that at least some of these protrusions will be in bearing engagement with the moldboard thus assuring that in use the shield will be in compression with the moldboard.

Although the shield extension 26 is not secured to the moldboard 12 on the plow frame, the shin section 24 is bolted or otherwise fastened to the supporting frame. This is preferably accomplished by casting bolt holes 36 in the shin section at the time the combined shin and shield is formed. The same casting operation is also used to form the bumps or projections 34 on the guard plate extension 26. The whole unit 16 is therefore a cast body shaped in this manufacturing operation with the thicker shin section 24, thinner shield or guard plate 26, rounded ridge 20, shoulder 22, bumps 34 and bolt holes 36. Moreover, as suggested earlier herein, it is highly desirable to form the whole unit 16 of material more wear resistant than the moldboard, which is usually formed of pressed steel, and preferably to form such unit out of a cast stainless steel alloy which is exceptionally tough, hard and durable and therefore highly resistant to wear. In addition, such material provides a mirror-like polished surface which is rustless under atmospheric conditions.

In view of the virtues of stainless steel alloys for wear resistance, one might inquire why not form all of the parts of the plow out of such material, or even just the moldboard itself. In either case, the cost including the cost of the molten metal molding equipment would be prohibitively expensive. Similarly, one might raise a question about completely covering the conventional moldboard with a stainless steel sheet. In this last case, in addition to the cost of the stainless steel material and the molten metal casting equipment therefor, the cover sheet would need provision for fastening it to the moldboard or its supporting frame. If this should require drilling holes in the almost undrillable material of the stainless steel sheet, the total would price this arrangement competitively well beyond the conventional plow moldboard made of pressed steel.

What the present invention accomplishes is to provide a relatively small expanse of highly wear resistant material as a substitute for one of the conventional parts of the plow while at the same time providing an integral extension of this part likewise formed of the same material which acts as a shield or guard plate for that minor area of the moldboard where its greatest wearing occurs. Moreover, the invention provides this advantage without requiring the bolting or fastening of the shield to the moldboard or to the supporting frame for the plow. Thus, the small sized unit 16 composed of the shin part 24 and its extension 26, and having bolt holes 36 already cast in the shin, can be molded of a tough wear resistant stainless steel alloy and quickly and conveniently installed on the plow frame with no more difficulty than the installation of a conventional shin member. In other words, by virtue of the invention, it is now possible to approach the advantages of making the entire moldboard of an alloy of stainless steel without encountering the severe if not prohibitive costs heretofore estimated for forming the moldboard of such material.

As heretofore mentioned, FIG. 7 illustrates a use of the invention for protectively shielding the greatest wearing area of a new or unused moldboard. In this case, it would usually be desirable to omit the protrusions or bumps 34 on the back side of the shield or guard plate 26 for providing substantial surface contact between the unused moldboard and the shield as illustrated in FIG. 7. This could be done by avoiding the formation of these protrusions during the metal casting operation. Or the protrusions 34 could be completely ground down by the farmer who purchased the unit 16 until substantial surface engagement is made between the shield 26 and the unused moldboard. In the case of slightly worn moldboards, the extent of the grinding operation may be made to depend on the extent of wear suffered by the moldboard.

While particular embodiments of the invention have been illustrated and discussed, it will be understood, of course, that it is not desired that the invention be limited thereto since modifications may be made. It is therefore contemplated by the appended claims to cover any such modifications as fall within the true spirit and scope of the invention.

What is claimed is:

1. A plow including a moldboard member and a shin member, said shin member having a thicker forward section and a thinner rearward section forming a shoulder on the non-working back side of the shin member at the juncture of the two sections, said shin member being mounted with respect to the moldboard member such that the shoulder of the shin member abuts the leading edge of the moldboard member and the rearward section of the shin member overlies the working face of the moldboard member.

2. The plow as set forth in claim 1 wherein the thinner rearward section of the shin member is provided with a plurality of spaced apart protrusions projecting outwardly from the back side thereof for bearing support against the working face of the moldboard member over which the rearward section lies.

3. The plow as set forth in claim 2 wherein the plurality of spaced apart protrusions are integrally formed with the rearward section of the shin member and are arranged in an arcuate row partially surrounding the greatest wearing area of the working face of the moldboard member.

4. The plow as set forth in claim 3 wherein the protrusions extend to a height not exceeding approximately the thickness of the thinner rearward section of the shin member.

5. The plow as set forth in claim 4 wherein the shin member together with its thinner rearward section and its protrusions is wholly composed of a cast stainless steel alloy.

6. A plow including, in combination, a moldboard member having a portion of its working face substantially thinned as a result of wear, a shin member divided into a thicker leading section and a thinner trailing section of approximately half the thickness of the leading section, said two sections of the shin member forming a smooth uninterrupted working face on their respective front sides and a substantially right-angled shoulder at their juncture on the rear side thereof, said shin member being mounted with respect to the moldboard member such that the shoulder of the shin member abuts the leading edge of the moldboard member and the trailing section of the shin member overlies the substantially worn area of its working face, and a plurality of spaced apart projections integrally joined to the back side of the trailing section of the shin member and protruding therefrom to a height not exceeding approximately the thickness of the trailing section of the shin member, at least one or more of these projections engaging the working face of the moldboard member for bearing support.

7. The plow as set forth in claim 6 wherein the shin member together with its leading and trailing sections and its projections is wholly composed of a cast stainless steel alloy.

8. A protective shin member for overlapping engagement with the moldboard of a plow, said shin member being divided into a thicker leading section and a thinner trailing section both of which are composed of the same material and integrally joined together, said two sections of the shin member presenting a smooth uninterrupted working face on their respective front sides and a shoulder at their juncture on the rear side thereof, said thinner trailing section of the shin member further being arcuately bowed in vertical cross section to conform substantially to the curvature of the moldboard for which it is designed, and a plurality of spaced apart projections carried on the rear side of the trailing section and composed of the same material as the trailing section and integrally joined thereto, said shoulder being adapted to abut the leading edge of a moldboard of a plow so that the trailing section thereof both overlaps and conforms to the curvature of the working face of the moldboard with one or more of the projections of the trailing section in bearing engagement with the moldboard.

9. The shin member of claim 8 wherein the projections are arranged in an arcuate series and so located as to partially surround the most severely worn area of the moldboard over which the trailing section lies.

10. The shin member of claim 9 wherein the material of shin member and all its parts are composed of a cast stainless steel alloy.

11. A protective guard for the moldboard of a plow assembly comprising a plow shin member and a plate-like rearward extension thereof, the plate-like extension of the shin member being shaped to overlie the maximum wearing area of the moldboard of the plow assembly for which the shin member is designed and arcuately bowed to conform substantially to the curvature of that area of the moldboard over which it will lie, said shin member and its plate-like extension being composed of the same material and integrally joined to one another and together presenting a smooth uninterrupted working face on their respective front sides, the back non-working side of said shin member at approximately the juncture of the rearward extension thereto being thickened to form a shoulder shaped for abutment with the leading edge of the moldboard of the plow assembly with which the shin member is associated so that its plate-like extension will overlie the maximum wearing area of the working face of the moldboard.

12. The moldboard protective guard of claim 11 wherein one or more projections are carried on the back side of said rearward extension for abutment with the maximum wearing area of the moldboard over which it lies.

13. The moldboard protective guard of claim 11 wherein a plurality of projections are carried on the back side of said rearward extension and are arranged in an arcuate row for engaging corresponding locations around the maximum wearing area of a moldboard over which the rearward extension of the shin member lies.

14. The moldboard protective guard of claim 11 wherein the shin member only has provision for attachment to the framework of a plow assembly, the rearward extension thereof being devoid of any such provision and relying solely on its connection to the shin member for its overlapping relationship with the moldboard.

15. A protective shin member for overlapping engagement with the moldboard of a plow, said shin member being divided into a thicker leading section and a thinner trailing section both of which are composed of the same material and integrally joined together, said two sections of the shin member presenting a smooth uninterrupted working face on their respective front sides and a shoulder at their juncture on the rear side thereof, and a plurality of spaced apart projections carried on the rear side of the trailing section and composed of the same material as the trailing section and integrally joined thereto, said projections being arranged in an arcuate series and so located that when the shin member is properly mounted on the moldboard the projections will partially surround the most severely worn area of the moldboard over which the trailing section lies, said shoulder being adapted to abut the leading edge of a moldboard of a plow so that the trailing section thereof overlaps the working face of the moldboard with one or more of the projections of the trailing section in bearing engagement with the moldboard.

16. The shin member of claim 15 wherein the thinner trailing section thereof is arcuately bowed in vertical cross section to conform substantially to the curvature of the moldboard for which it is designed.

17. The shin member of claim 16 wherein the material of shin member and all its parts are composed of a cast stainless steel alloy.

* * * * *